(12) United States Patent
Ulrich

(10) Patent No.: US 7,907,366 B2
(45) Date of Patent: Mar. 15, 2011

(54) REMOVABLE DATA CARTRIDGE

(75) Inventor: Michael H. Ulrich, Boulder, CO (US)

(73) Assignee: Prostor Systems, Inc., Boulder, CO (US)

( * ) Notice: Subject to any disclaimer, the term of this patent is extended or adjusted under 35 U.S.C. 154(b) by 384 days.

(21) Appl. No.: 11/470,199

(22) Filed: Sep. 5, 2006

(65) Prior Publication Data

US 2007/0091504 A1 Apr. 26, 2007

Related U.S. Application Data

(63) Continuation-in-part of application No. 29/241,308, filed on Oct. 25, 2005, now Pat. No. Des. 560,666.

(60) Provisional application No. 60/731,074, filed on Oct. 28, 2005.

(51) Int. Cl.
*G11B 23/03* (2006.01)

(52) U.S. Cl. .......................................... 360/133; 720/730

(58) Field of Classification Search ................ 360/97.01, 360/131–136, 903; 361/684; 365/52, 200; 439/31, 179; 710/13, 62; 720/719, 728, 720/729, 730, 736, 745

See application file for complete search history.

(56) References Cited

U.S. PATENT DOCUMENTS

| | | | |
|---|---|---|---|
| 3,650,378 A * | 3/1972 | Kakiuchi et al. ............. 206/514 |
| D260,881 S | 9/1981 | McKinsey et al. |
| 4,833,554 A * | 5/1989 | Dalziel et al. ............. 360/98.04 |
| D311,737 S | 10/1990 | Westwood et al. |
| 5,113,297 A * | 5/1992 | Yoshida ..................... 360/99.06 |
| 5,216,582 A | 6/1993 | Russell et al. |
| 5,537,281 A * | 7/1996 | Ma et al. ........................ 360/133 |
| 5,583,710 A | 12/1996 | Nicklos et al. |
| 5,694,278 A | 12/1997 | Summer |
| 5,721,655 A | 2/1998 | Thweatt |
| 5,790,374 A | 8/1998 | Wong |
| 5,818,029 A | 10/1998 | Thomson |
| D413,592 S | 9/1999 | Saiba et al. |

(Continued)

FOREIGN PATENT DOCUMENTS

JP 08096495 A 4/1996

(Continued)

OTHER PUBLICATIONS

Web Printout iVDR Cartridge Type, 2004.*

(Continued)

*Primary Examiner* — Brian E Miller
*Assistant Examiner* — Adam B Dravininkas
(74) *Attorney, Agent, or Firm* — Kilpatrick Townsend & Stockton LLP

(57) ABSTRACT

A removable data cartridge for storing information is disclosed. The removable data cartridge includes an outer casing and an electrical connector. The outer casing has a front side having an opening therein, a back side located opposite the front side, a left side, a left edge between the left side and the front side, a top side, a top edge between the top side and the front side wherein the top edge is longer than the left edge, and a bottom side. A keying feature of the outer casing extends from the front side toward the back side to prevent improper insertion of the removable data cartridge through a fixed aperture in a drive. The electrical connector accessible from outside the outer casing at the opening in the front side.

32 Claims, 9 Drawing Sheets

U.S. PATENT DOCUMENTS

| | | | |
|---|---|---|---|
| 5,969,914 | A * | 10/1999 | Nguyen .................. 360/133 |
| 5,986,992 | A | 11/1999 | Bardmesser |
| 6,064,569 | A | 5/2000 | Sands et al. |
| 6,231,224 | B1 | 5/2001 | Gamble et al. |
| 6,264,506 | B1 * | 7/2001 | Yasufuku et al. .............. 439/638 |
| 6,408,352 | B1 * | 6/2002 | Hosaka et al. ................. 710/301 |
| 6,419,403 | B1 | 7/2002 | Buller et al. |
| D462,093 | S | 8/2002 | Ashida |
| 6,431,718 | B1 | 8/2002 | Gamble et al. |
| 6,457,992 | B2 | 10/2002 | Posey et al. |
| 6,473,300 | B1 | 10/2002 | Youngquist et al. |
| 6,487,049 | B1 | 11/2002 | Hall |
| D470,851 | S | 2/2003 | Nishio et al. |
| D474,193 | S | 5/2003 | Nakayama |
| D478,358 | S | 8/2003 | Ashida |
| 6,611,394 | B1 | 8/2003 | Kato et al. |
| 6,614,751 | B1 | 9/2003 | Katao |
| 6,618,795 | B2 | 9/2003 | Chan et al. |
| 6,674,596 | B1 | 1/2004 | Takayama |
| 6,717,762 | B1 | 4/2004 | Bauck et al. |
| 6,717,769 | B2 | 4/2004 | Staley et al. |
| 6,728,187 | B2 | 4/2004 | Diaz et al. |
| 6,762,930 | B2 | 7/2004 | Minne' |
| 6,785,896 | B2 | 8/2004 | Huang |
| 6,831,831 | B2 | 12/2004 | Bicknell et al. |
| 6,865,640 | B2 | 3/2005 | Dimitri et al. |
| 6,892,275 | B2 | 5/2005 | Bolt et al. |
| 6,957,291 | B2 | 10/2005 | Moon et al. |
| 6,968,561 | B2 | 11/2005 | Katao |
| D521,509 | S * | 5/2006 | Chen ...................... D14/480.5 |
| D523,859 | S | 6/2006 | Deckers |
| 7,296,098 | B2 * | 11/2007 | Shih ................................ 710/13 |
| 7,307,836 | B2 | 12/2007 | Scicluna et al. |
| 7,321,489 | B2 | 1/2008 | McAlister |
| 7,656,608 | B1 * | 2/2010 | Eichel .......................... 360/92.1 |
| 2001/0009505 | A1 * | 7/2001 | Nishizawa et al. ............ 361/737 |
| 2002/0135938 | A1 | 9/2002 | Hiraguichi et al. |
| 2002/0196577 | A1 | 12/2002 | Harmer |
| 2003/0011981 | A1 * | 1/2003 | Curtis et al. ................... 361/685 |
| 2003/0033399 | A1 * | 2/2003 | Garnett et al. ................. 709/223 |
| 2003/0149700 | A1 | 8/2003 | Bolt |
| 2003/0183698 | A1 * | 10/2003 | Wu ................................ 235/492 |
| 2003/0218957 | A1 | 11/2003 | Tanishima |
| 2004/0032711 | A1 | 2/2004 | Kaczeus et al. |
| 2004/0075977 | A1 * | 4/2004 | Lee ................................ 361/684 |
| 2004/0081054 | A1 | 4/2004 | Nguyen |
| 2004/0181388 | A1 | 9/2004 | Yip et al. |
| 2004/0252408 | A1 | 12/2004 | Oba et al. |
| 2005/0033911 | A1 | 2/2005 | Kitamura et al. |
| 2005/0046998 | A1 * | 3/2005 | Hwang ..................... 360/97.01 |
| 2005/0105346 | A1 * | 5/2005 | Shih ............................. 365/200 |
| 2005/0148224 | A1 * | 7/2005 | Ootori et al. ................... 439/179 |
| 2005/0182872 | A1 * | 8/2005 | Shih ................................ 710/62 |
| 2005/0185438 | A1 * | 8/2005 | Ching ............................. 365/52 |
| 2005/0193235 | A1 | 9/2005 | Sandorfi et al. |
| 2006/0030080 | A1 * | 2/2006 | Hsueh et al. ................... 438/126 |
| 2006/0048001 | A1 * | 3/2006 | Honda et al. ..................... 714/7 |
| 2006/0084284 | A1 * | 4/2006 | Hsieh ............................. 439/31 |
| 2006/0129373 | A1 | 6/2006 | Georgis |
| 2008/0144270 | A1 * | 6/2008 | Dal Porto et al. ............. 361/684 |

FOREIGN PATENT DOCUMENTS

WO   WO 99/14752 A   3/1999

OTHER PUBLICATIONS

"What is iVDR?," printout from website http://www.ivdr.org/iVDR/ivdr_e.html, 2 pages, printout date: May 27, 2004.

* cited by examiner

REMOVABLE DATA CARTRIDGE

This application claims the benefit of and is a non-provisional of co-pending U.S. Provisional Application Ser. No. 60/731,074 filed on Oct. 28, 2005. This application also claims the benefit of and is a continuation-in-part of co-pending U.S. Design Application Ser. No. 29/241,308 filed on Oct. 25, 2005. Both of these applications are hereby expressly incorporated by reference in their entireties for all purposes.

BACKGROUND

This disclosure relates in general to disk cartridges and, but not by way of limitation, to disk cartridges encapsulating flash or rotating disk media.

A removable data cartridge is a portable device that contains some sort of electronically readable information. To access or modify the information, an operator inserts the cartridge into a special receptacle or drive, which interfaces with the cartridge. Examples of data cartridges include floppy disks and tape cartridges that are physically interfaced to the drive. A tape cartridge can be inserted to engage a read/write head. The read/write head magnetically engages the tape to read or write information.

Some tape cartridges contain an electronic memory chip separate from the tape medium which can be used to store some metadata. Often these memory chips are coupled to a RFID system to enable wirelessly reading of the RFID chip memory using electromagnetic energy. The data stored on the tape cartridge cannot be read from the RFID chip, but only the metadata relating to the tape cartridge.

Some magnetic tape cartridges have keying features to prevent some types of improper insertion into a drive. For example, the cross-section of the Travan™ tape cartridges is shaped like an up-side-down capital letter T. Attempts to insert these tapes such that the T shape is right-side-up are prevented by an aperture in the drive bezel. Floppy disks do not have anything to prevent improper insertion such that doing so may damage the disk and/or drive.

SUMMARY

In one embodiment, the present disclosure provides a removable data cartridge for storing information. The removable data cartridge includes an outer casing and an electrical connector. The outer casing has a front side having an opening therein, a back side located opposite the front side, a left side, a left edge between the left side and the front side, a top side, a top edge between the top side and the front side wherein the top edge is longer than the left edge, and a bottom side. A keying feature of the outer casing extends from the front side toward the back side to prevent improper insertion of the removable data cartridge through a fixed aperture in a drive. The electrical connector accessible from outside the outer casing at the opening in the front side.

In another embodiment, the present disclosure provides a removable data cartridge for storing information. The removable data cartridge includes an outer casing and an electrical connector. The outer casing includes a front side having an opening therein, a back side located opposite the front side, a left side, a left edge between the left side and the front side, a top side, a top edge between the top side and the front side wherein the top edge is longer than the left edge, a bottom side, and a keying feature extending from the front side toward the back side. The keying feature prevents improper insertion of the removable data cartridge through an aperture in a drive. A cross-section oriented parallel to the front side is not symmetric about any line extending from the top side to the bottom side. The electrical connector is accessible from outside the outer casing at the opening in the front side.

In yet another embodiment, the present disclosure provides a removable data cartridge for storing information. The removable data cartridge includes an outer casing and an electrical connector. The outer casing includes a front side having an opening therein, a back side located opposite the front side, a left side, a left edge between the left side and the front side, a top side, a top edge between the top side and the front side wherein the top edge is longer than the left edge, a bottom side, and a keying feature extending from the front side to the back side. The keying feature prevents improper insertion of the removable data cartridge through an aperture in a drive. A cross-section oriented parallel to the front side is not a mirror image about any line extending from the top side to the bottom side. The electrical connector accessible from outside the outer casing at the opening in the front side.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

In the following description, specific details are given to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The present invention is embodied in a removable data cartridge with unique features. The data cartridge is inserted through an aperture in a drive bay where an electrical connector included with the data cartridge couples to a matching connector inside the drive bay. Proper insertion, alignment, and removal of the data cartridge are facilitated by a keying feature. The keying feature blocks insertion into the drive bay except when the data cartridge is properly aligned and oriented. This prevents damage to the data cartridge and the drive bay that may result from improper insertion, particularly when force is used. Additional features of the data cartridge for various embodiments could include: grips to facilitate human and/or mechanical handling, a latching mechanism for securing the data cartridge within the drive bay, a write protect feature, and/or a visual status indicator.

Figure 1:
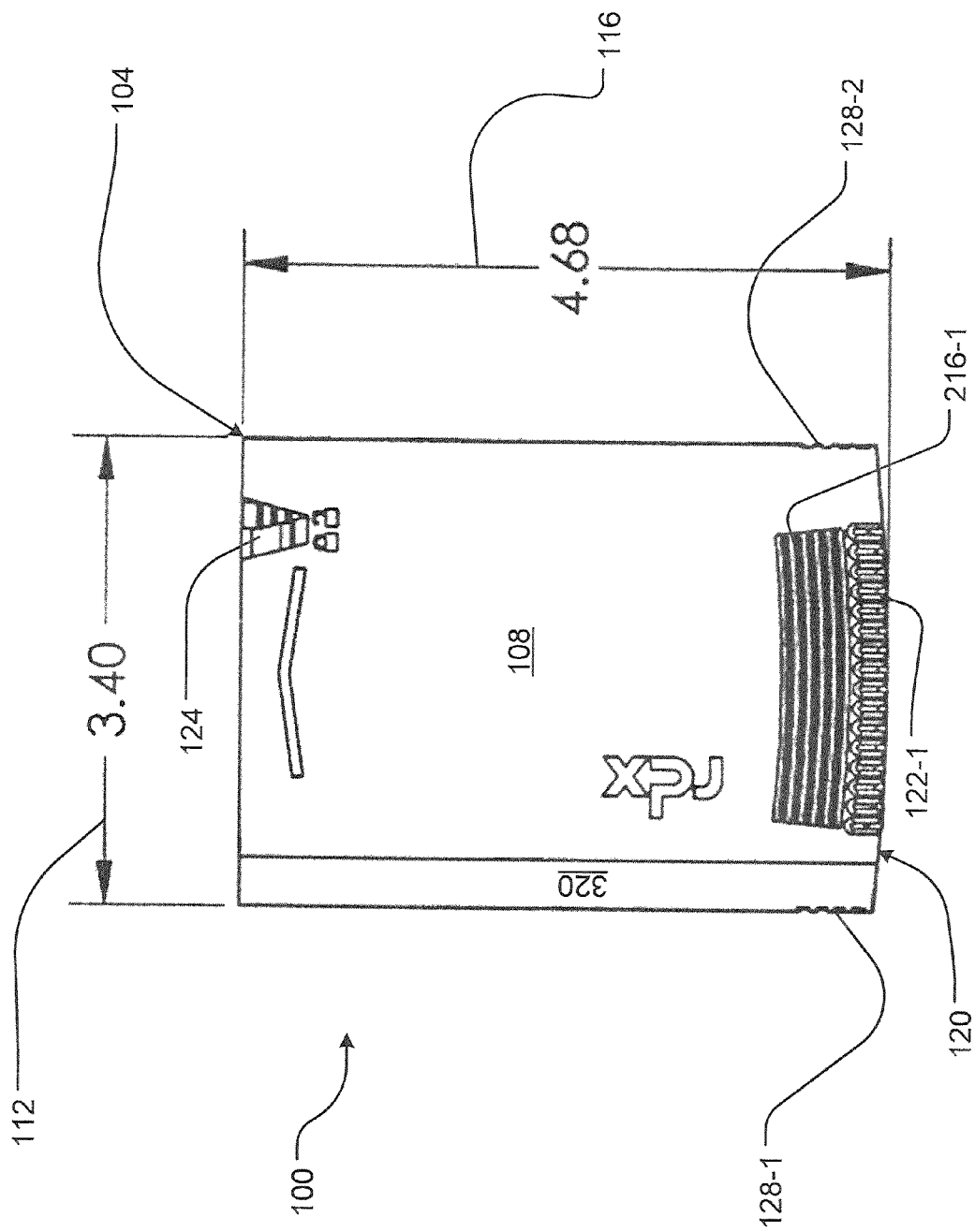
FIG. 1 depicts a top plan view of an embodiment of a removable data cartridge.

Referring initially to FIG. 1, a top of an embodiment of a removable data cartridge 100 is shown. This view depicts the top side 108 of the outer casing 104. The top side 108 has length 116 and width 12 dimensions. In an exemplary embodiment, the length 116 is approximately 118.9 mm (4.68 inches) and the width 112 is approximately 88.4 mm (3.4 inches); however, other embodiments of the data cartridge may have different dimensions based upon their intended applications.

Generally, the outer casing 104 is large enough to enclose a hard drive. For example, an embodiment of the data cartridge 100 is designed to house a standard 2.5 inch laptop hard drive could have length 116 of at least 101 mm (3.94 inches) and width 112 of at least 70 mm (2.76 inches). A data cartridge for use with a 1.8 inch hard drive could be smaller and a data cartridge with a 3.5 inch hard drive could be larger. For example, a data cartridge designed to accommodate a 1.8 inch TRAVELSTAR™ by Hitachi could have length 116 of at least 70 mm (2.76 inches) and width 112 of at least 60 mm (2.37 inches). Similarly, a data cartridge used with a 1.8 inch drive by Toshiba could have length 116 of at least 79 mm (3.11 inches) and width 112 of at least 54 mm (2.13 inches). Data cartridges intended for use with solid state memory devices might have still other sizes. For example, embodiments used with flash memory chips could be significantly smaller than those designed for use with hard drives or could use the same form factor.

The top side 108 of the outer casing 104 includes a write-protect feature 124. In some embodiments, the write protect feature 124 may be a slider that can be moved into one of two positions. Changing the position of the slider correspondingly selects or deselects the write-protect feature 124. A drive bay may determine the position of the write-protect feature and enable or disable write functions accordingly without affecting the ability to read from the data cartridge. In other embodiments, the write-protect feature 124 may comprise alternative activation means such as a tab, a push button, or a rocker switch. Additional embodiments may use optical or electrical sensors to activate the write-protect feature.

The data cartridge 100 may also include a rounded back edge 120. The rounded edge 120, in combination with left/right side handgrips 128-1 and 128-2, respectively and top/bottom handgrips 216-1 and 216-2 (see FIG. 2), respectively, provide a visual indication of proper data cartridge orientation for insertion into a drive bay. Thus, these elements may quickly guide a human operator to the correct orientation of the data cartridge in relation to the drive bay. In an exemplary embodiment, the rounded edge follows the curvature of a circle having a radius of 39.37cm (15.5 inches), but a squared edge or other radiuses are possible. Further guarding for improper insertion is a keying feature 320 that works in conjunction with an aperture in the drive bay to prevent insertion in any other orientation than front-side-first. Other embodiments could use another keying feature(s) to prevent improper insertion.

A hard drive in the data cartridge 100 can produce heat. The enclosure 104 can trap the heat to cause overheating of the hard drive in some embodiments. On the edge between the top and back sides and the edge between the bottom and back sides, this embodiment includes sixteen vent holes 122-1 that allow air to flow inside or outside the outer casing 104. Other embodiments could have more or less vent holes. Also, vent holes could be placed in different locations of the outer casing 104.

Figure 2:
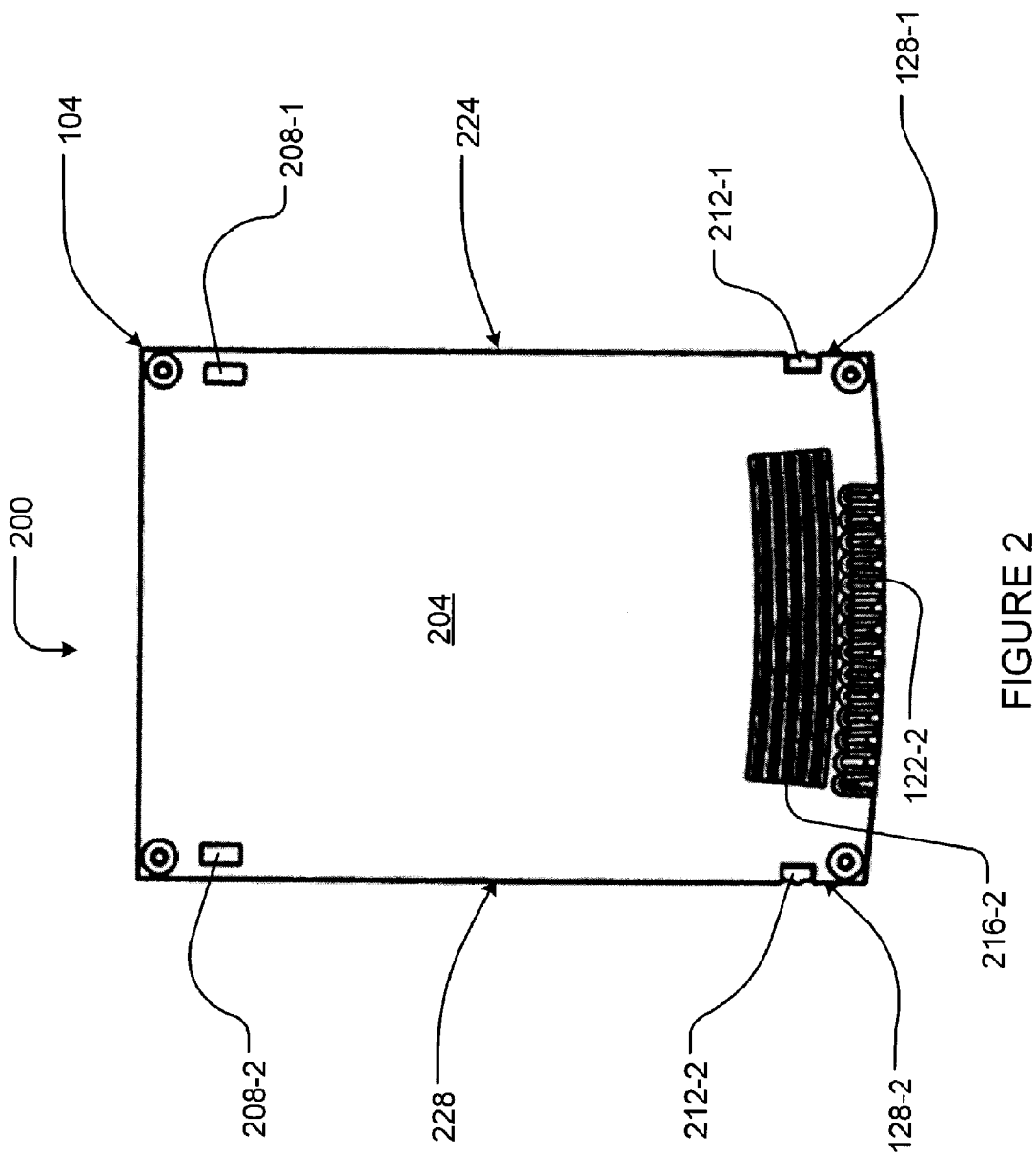
FIG. 2 depicts a bottom plan view of an embodiment of the removable data cartridge.

Referring next to FIG. 2, a bottom view of an embodiment of a data cartridge 200 is shown. This view illustrates the data cartridge 200 loading features. Loading the data cartridge into a drive bay can be accomplished by a human operator or a mechanical loader. A human operator holds the data cartridge by handgrips 128 located on the right side 228 of the data cartridge 200 and the left side 224 of the data cartridge 200 and inserts it through an aperture in a drive bay until the data cartridge engages an electrical mating connector. The aperture could be in the bezel or behind the bezel. Some embodiments may include a "soft load" mechanism that pulls the data cartridge 200 into the drive bay by means of front and rear loading grips 208, 212 after initial partial-insertion by a human operator or a loading arm. Other embodiments may have the human operator to fully insert the data cartridge into the drive bay.

Machine loaders within the drive can manipulate the data cartridge at multiple points. These points may correspond to different stages in a loading procedure. For example, a machine loader may initially position the data cartridge in front of an aperture using left/right front loading grips 208-1 and 208-2, respectively, and then switch to the left/right rear loading grips 212-1 and 212-2, respectively, once insertion has started. Similarly, a machine loader may reverse this process to extract the data cartridge from the drive bay. A center loading grip 216 is included on the top and bottom sides 108, 204 of the data cartridge 200 to further facilitate insertion and removal operations. The autoloader may replace the human operator regardless of whether the drive has a soft load mechanism.

Figure 3:
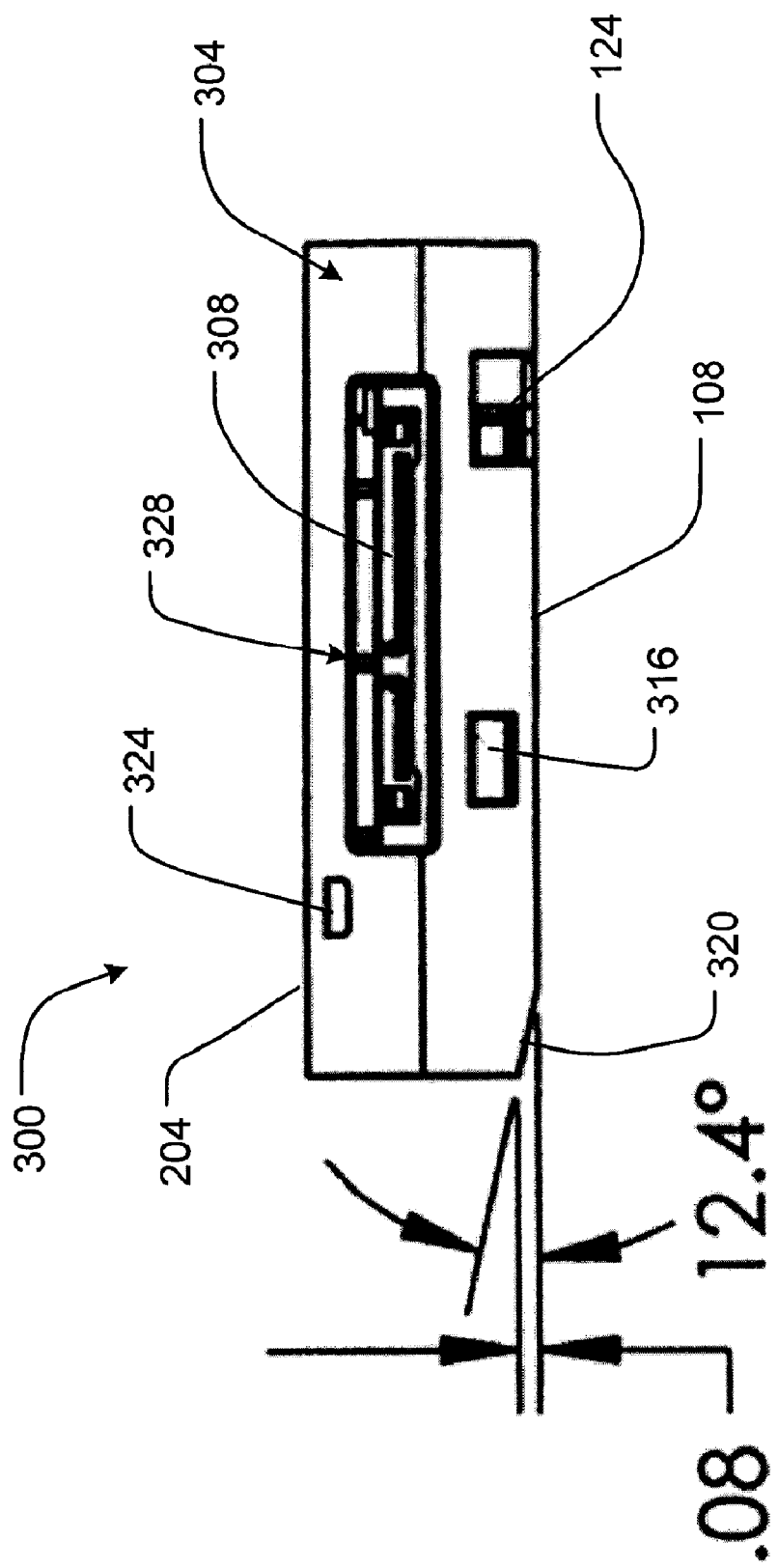
FIG. 3 depicts a front elevational view of an embodiment of the removable data cartridge.

With reference to FIG. 3, a front view of an embodiment of a data cartridge 300 is shown. The front side 304 of the data cartridge is inserted through an aperture in a drive bay. The aperture is rigid and fixed in shape for this embodiment. As mentioned previously, the data cartridge includes a keying feature 320 that will fit through the aperture only when the data cartridge is properly aligned and will block attempts to insert the data cartridge improperly (e.g., backward, sideways or up-side-down insertion). The keying feature 320 also prevents problems that result when a misaligned data cartridge is inserted part of the way into an aperture ("partial misinsertion"). Data cartridges 300 that have no keying feature or that have a symmetrical keying feature may be susceptible to partial misinsertion and damage to the data cartridge or the drive bay. The present invention avoids this damage in one embodiment.

In an exemplary embodiment, the keying feature 320 is a beveled surface disposed between the top side and the left side of the data cartridge 300. The beveled surface may form an angle of 12.4° with the top side of the data cartridge and may extend 2.03 mm (0.08 inch) toward the bottom side of the data cartridge in one embodiment. Other embodiments may include keying features with different designs. For example, the keying feature 320 could form a convex or concave surface and might extend the full length of the left side or less than the full length of the left side. Where the keying feature only extends part of the length of the data cartridge 300, the aperture may prevent insertion beyond the end of the keying feature such that the drive extends out of the drive bay for the remainder of the length of the data cartridge 300. In alternative embodiments, the keying feature 320 could be positioned between the top side 108 and the right side 228 of the data cartridge 300 or between the bottom side 204 of the data cartridge and either the left side 224 or the right side 228. In each case, however, the keying feature 320 is selected so that the data cartridge 300 can be inserted through an aperture in a drive bay only in the proper orientation during normal operation.

The front side 304 of the data cartridge includes an opening 328 in the casing 104 that permits access to an electrical connector 308. The electrical connector 308 provides a physical interface to allow storage devices and technologies to be used with the data cartridge 300. In an exemplary embodiment, the electrical connector 308 is configured to support an industry standard hard drive protocol. Thus, the electrical connector 308 may permit SCSI, SAS, SATA, and/or PATA storage devices to be used within the data cartridge 300. These may include hard drives and devices that emulate hard drives. For example, a 1.8 inch, 2.5 inch, or 3.5 inch hard drive might be mounted inside the data cartridge 300 and coupled to the electrical connector. Similarly, the data cartridge 300 light be adapted for use with flash memory chips. In other embodiments, the electrical connector 308 may use a USB, PCM-CIA, firewire, and/or wireless connection.

Some embodiments could have the electrical connector behind a flap, recessed into the casing 104 or extending from the casing 104. The electrical connector 308 is off-center with respect to both the top and bottom sides 108, 204 and the right and left sides 228, 224 to further provide keying such that improper orientation will not allow proper mating of the electrical connector 308 with its counterpart in the drive bay.

A catch 316 is included in the front side 304 of the data cartridge 300. The catch 316 cooperates with a latching mechanism in the drive bay to hold the data cartridge 300 securely in place. Upon full insertion into the drive bay, the latching mechanism engages with the catch 316 and remains engaged until the data cartridge 300 is ejected as explained further below. Some embodiments do not use a latching mechanism that engages the catch 316 in favor of no locking of the cartridge or an alternative latching mechanism.

A light pipe 324 is also included on the front side 304 of the data cartridge 300. The light pipe 324 couples to a light source within the drive bay upon insertion of the data cartridge 300 and provides a channel extending from the front side 304 to a back side of the data cartridge 300. Thus, light passing through the light pipe 324 is visible from the back side of the data cartridge 300 and may provide status information to a human operator, for example. Status information, for example, may include whether power is being supplied to the electrical conductor and whether a device mounted inside the data cartridge is currently in use. Other embodiments could have no light pipe or multiple light pipes. The light pipe 324 may couple with several light sources of different colors in the drive bay to convey a multitude of conditions.

Figure 4:
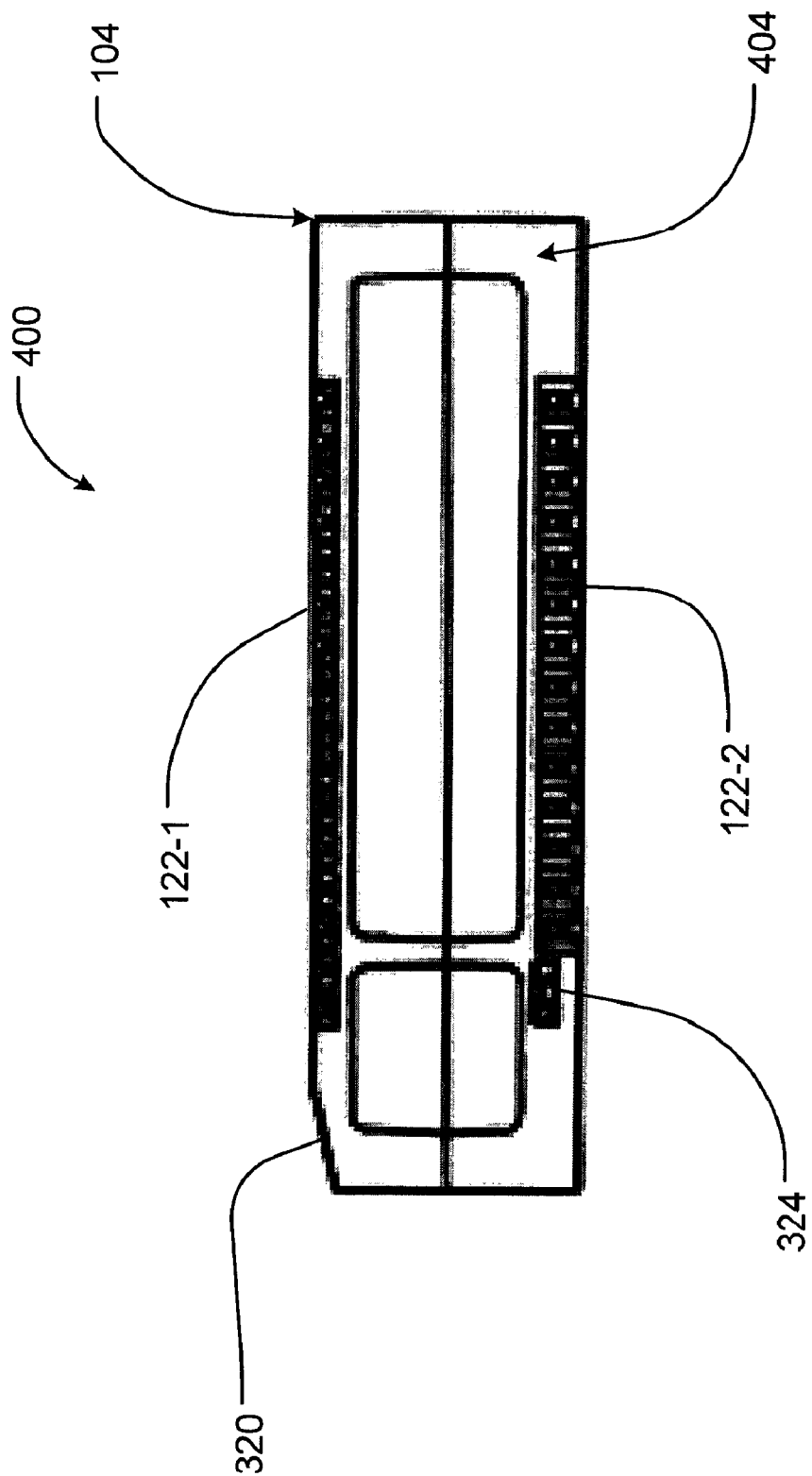
FIG. 4 depicts a back elevational view of an embodiment of the removable data cartridge.

Referring to FIG. 4, a back view of an embodiment of a data cartridge 400 is shown. The back side 404 of the data cartridge 400 is accessible from outside of the drive bay in this embodiment. Some embodiments of the drive bay may allow insertion of the data cartridge completely through the aperture such that the data cartridge 400 is not accessible until after ejection. The vent holes 122 and the light pipe 324 are visible from the back side 204 of the data cartridge. The light pipe 324 extends the full length of the data cartridge 400 in this embodiment such that an emitting end is visible when viewing the back side 404 of the data cartridge 400. In this embodiment, the keying feature 320 extends the full length of the data cartridge 400 and is visible from the back side 404. In other embodiments, the keying feature 320 may or may not be visible from the back side 404 of the data cartridge.

Figure 5:
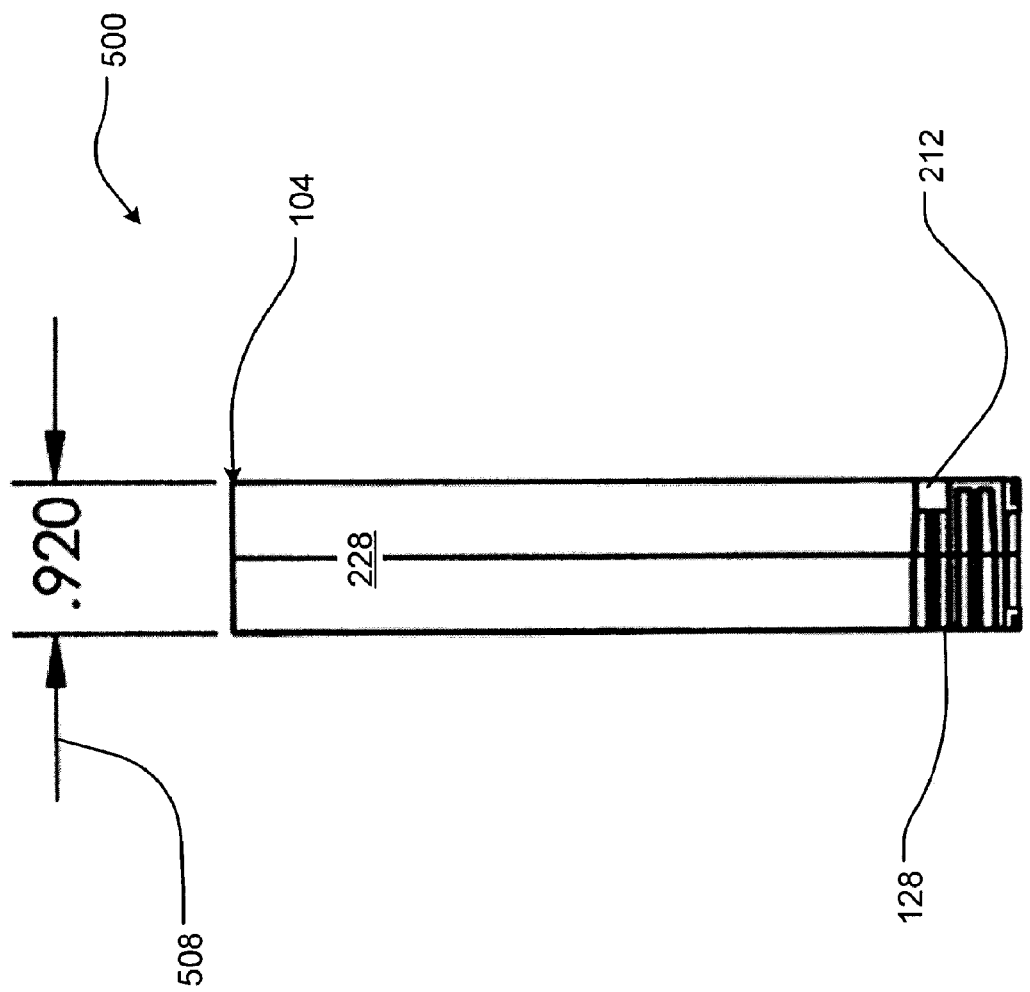
FIG. 5 depicts a right view of an embodiment of the removable data cartridge.

With reference to FIG. 5, a right view of an embodiment of a data cartridge 500 is shown. The right side 228 illustrates the thickness 508 of the data cartridge 500. In an exemplary embodiment, the data cartridge has a thickness 508 of 22.9 mm (0.920 inch). However, as previously discussed, dimensions may change to suit particular applications of the data cartridge 500. Thus, for example, the thickness 508 of the data cartridge 500 may increase or decrease depending upon the type of storage device mounted inside the data cartridge 500.

Figure 6:
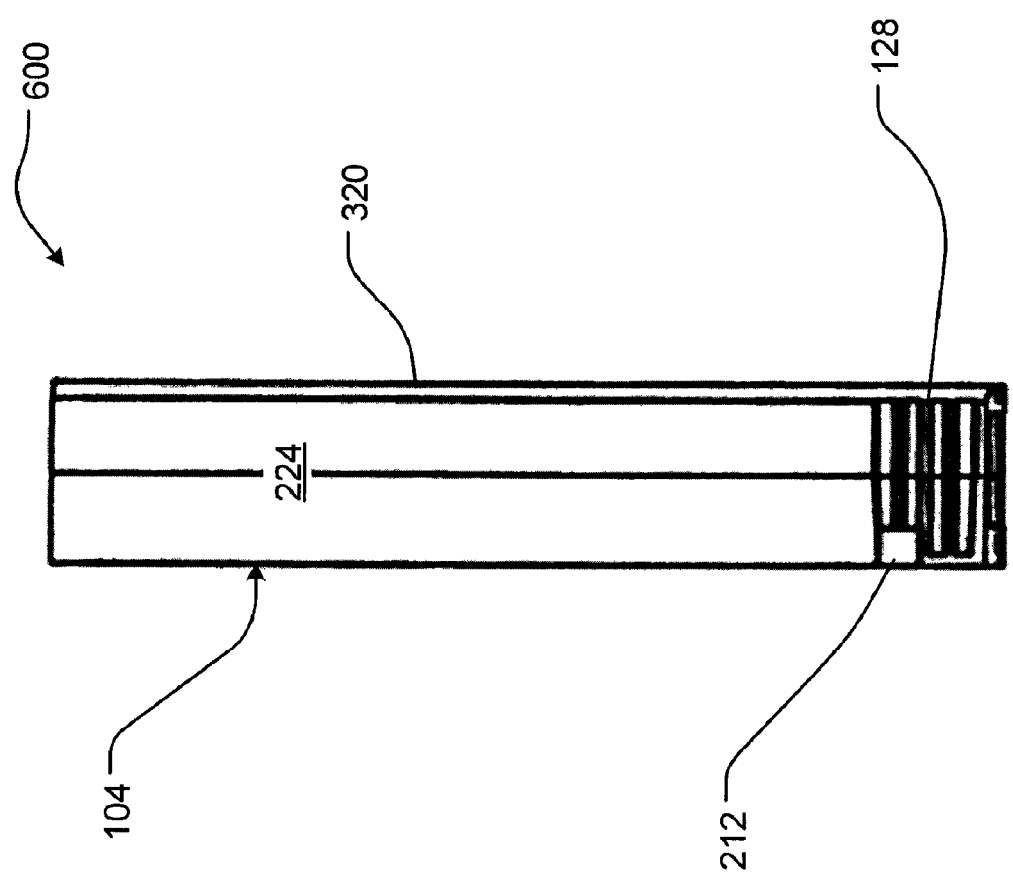
FIG. 6 depicts a left view of an embodiment of the removable data cartridge.

Referring next to FIG. 6, a left view of an embodiment of a data cartridge 600 is shown. The left side 224 of the data cartridge 600 is similar to the right side 228 and includes handgrips 128 and loading grips 212. A seam is shown extending the length of the data cartridge 600 and is visible in some other figures. The seam marks where the two halves of the casing 104 are mated together during assembly for this embodiment.

Figure 7:
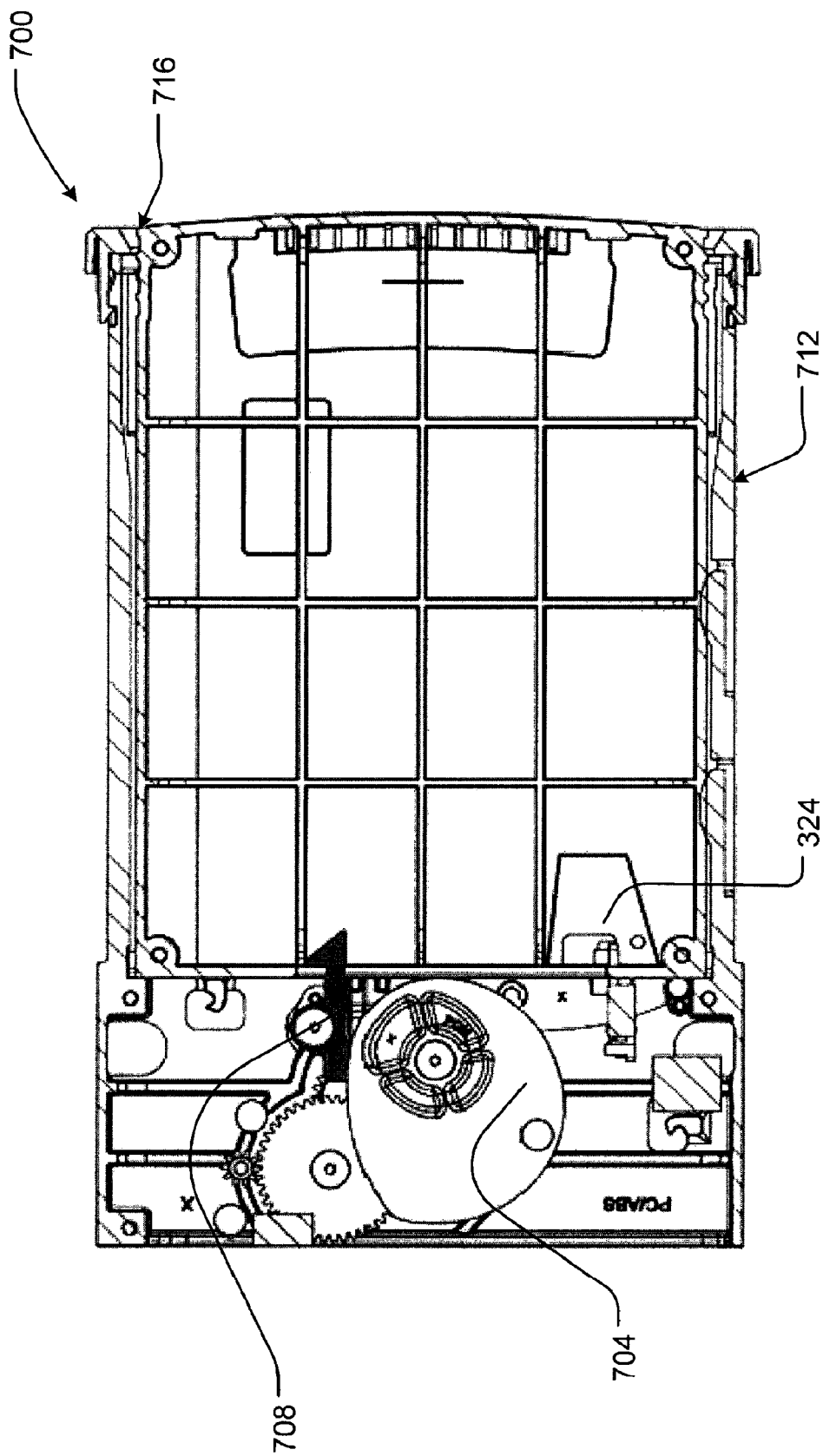
FIG. 7 depicts a top cut-away view of an embodiment of a drive with the removable data cartridge inserted.

Referring to FIG. 7, a top cut-away view 700 of a data cartridge 100 inserted into a drive bay 716 is shown. The data cartridge 100 is shown fully inserted into the drive bay 716 to allow electrical and mechanical engagement of the data cartridge 100 with the drive 712. The drive bay 716 is part of a drive 712, where the drive bay serves as a receptacle for the data cartridge 100. This view shows the latching mechanism 708 engaged with the catch 316. The latching mechanism 708 is operated by a motorized cam 704 as the data cartridge 100 is inserted into the drive bay 716. Upon full insertion, the catch 316 and the latching mechanism 708 cooperate to hold the data cartridge 100 securely in place. Also shown is the write protect feature 324.

Figure 8:
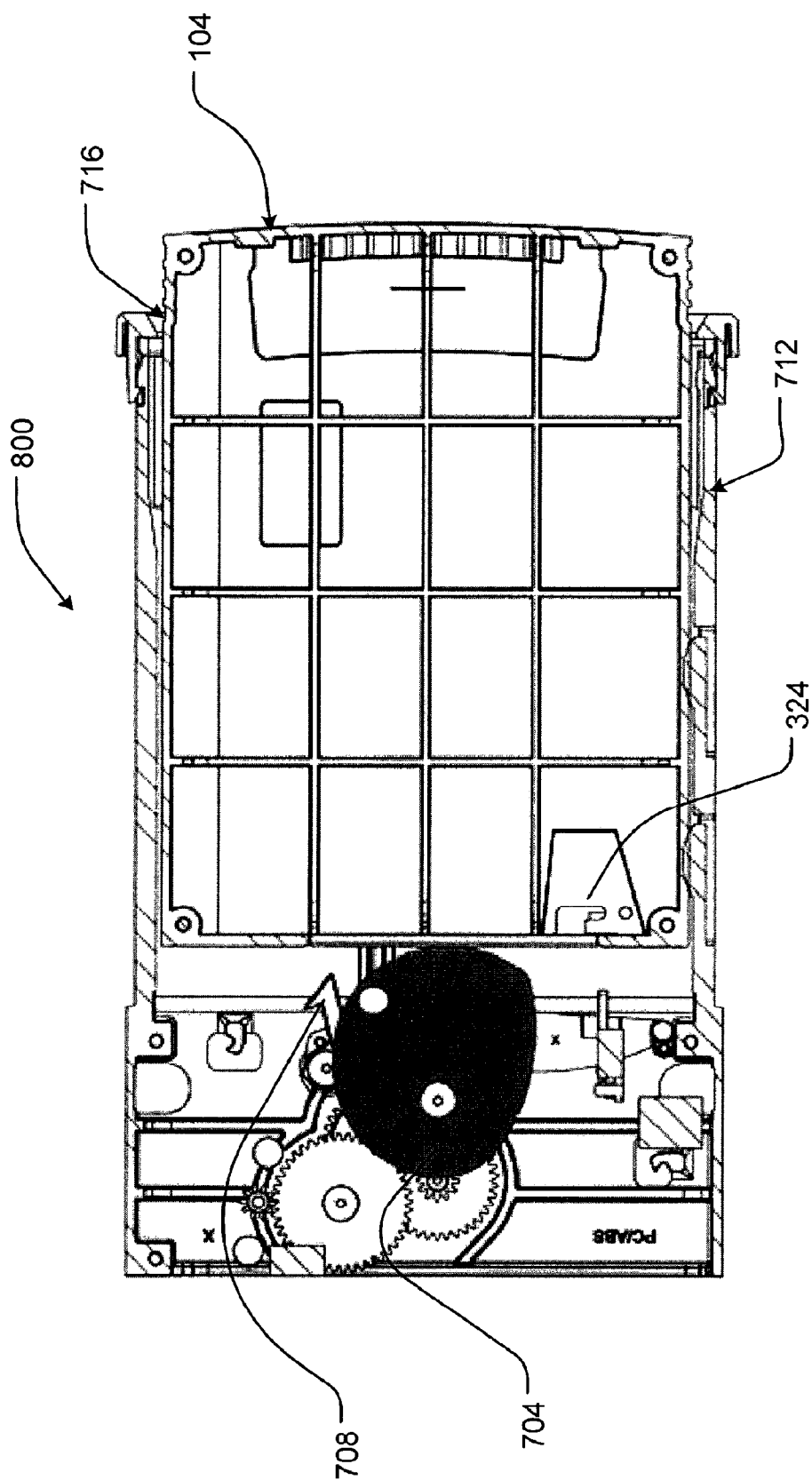
FIG. 8 depicts a top cut-away view of an embodiment of the drive with the removable data cartridge inserted.

Referring to FIG. 8, a top cut-away view 800 of a data cartridge 100 inserted into a drive bay 716 is shown. In this view, the cam 704 has been actuated to release the latching mechanism 708 and partially-eject the data cartridge 100 in a single rotation of the cam 704. The back side 404 of the data cartridge 100 is shown protruding more extensively through the aperture of the drive bay 716. The electrical connection between the drive 712 and the drive bay 716 is broken after actuation of the cam 704. Other embodiments could use a piston to disengage the data cartridge 100 or a mechanism coupled to the front and rear loading grips 208, 212.

Figure 9:
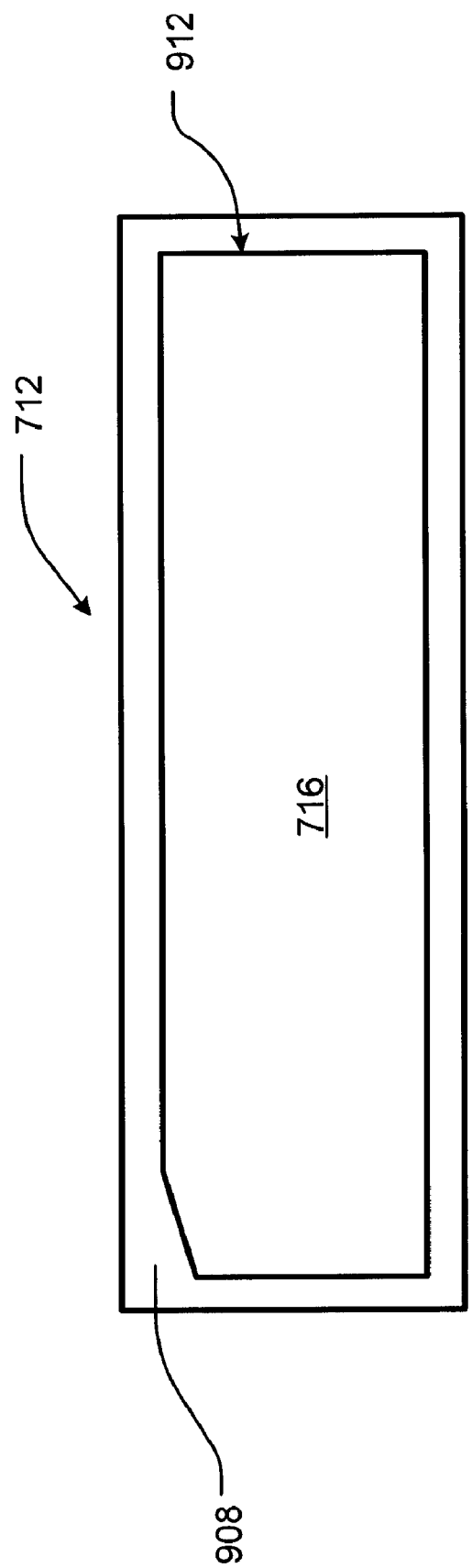
FIG. 9 depicts a front elevational view of an embodiment of the drive.

With reference to FIG. 9, a front view of an embodiment of the drive 712 is shown. An aperture 912 is formed in the drive bezel 908 to demark the opening of the drive bay 716. The aperture 912 is large enough to accommodate the data cartridge 100 when inserted properly, but prevents improper insertion. The drive bay may or may not have a door that is pushed out of the way upon insertion of a data cartridge 100. The drive 712 can be mounted in a drive array, a computer or an external enclosure. Other embodiments could have status lights and/or a display on the drive 712.

The above description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A removable data cartridge for storing information, the removable data cartridge comprising:
   an outer casing, including:
      a front-most front side surface having first and second openings therein, the second opening above the first, and the second opening having at least one straight edge and forming a catch for a latching mechanism,
      a back-most back side surface located opposite the front side surface,
      a left side surface,
      a left edge between the left side surface and the front side surface,
      a top side surface,
      a top edge between the top side surface and the front side surface wherein the top edge is longer than the left edge,
      a bottom side surface, and
      a keying feature extending a full length of the cartridge casing from the front-most front side surface to the back-most back side surface, wherein:
         the keying feature prevents improper insertion of the front side surface of the removable data cartridge through a fixed aperture in a drive,
         a cross-section of the front side surface comprises:
            at least two outer edges, and
            a keying feature edge connected between the two outer edges further wherein the cross-section of the front side surface is oriented parallel to the front side surface;
   an electrical connector accessible from outside the outer casing at the first opening in the front side surface; and
   a memory device restrained on all sides within the outer casing.

2. The removable data cartridge for storing information as recited in claim 1, wherein the cross-section oriented parallel to the front side surface has at least five edges.

3. The removable data cartridge for storing information as recited in claim 1, wherein the keying feature comprises a beveled surface.

4. The removable data cartridge for storing information as recited in claim 1, wherein the electrical connector provides an interface for use with a hard drive protocol.

5. The removable data cartridge for storing information as recited in claim 4, wherein the hard drive protocol is compliant with SAS, PATA, SATA, or SCSI.

6. The removable data cartridge for storing information as recited in claim 5, wherein the memory device comprises a hard drive.

7. The removable data cartridge for storing information as recited in claim 1, wherein the memory device comprises a solid state memory device.

8. The removable data cartridge for storing information as recited in claim 1, wherein the top side surface has a length that is at least 70 mm and a width that is at least 60 mm and the bottom side surface has a length that is at least 70 mm and a width that is at least 60 mm.

9. The removable data cartridge for storing information as recited in claim 1, wherein the top side surface has a length that is at least 100 mm and a width that is at least 70 mm and the bottom side surface has a length that is at least 100 mm and a width that is at least 70 mm.

10. The removable data cartridge for storing information as recited in claim 1, wherein the at least two outer edges comprise the top edge and the left edge.

11. The removable data cartridge for storing information as recited in claim 1, wherein the keying feature edge is straight.

12. The removable data cartridge for storing information as recited in claim 1, wherein one of the two outer edges is parallel to the left edge.

13. The removable data cartridge for storing information as recited in claim 1, wherein one of the two outer edges is parallel to the top edge.

14. The removable data cartridge for storing information as recited in claim 1, wherein the two outer edges are perpendicular with respect to each other.

15. A removable data cartridge for storing information, the removable data cartridge comprising:
   an outer casing, including:
      a front-most front side surface having first and second openings therein, the second opening above the first, and the second opening having at least one straight edge and forming a catch for a latching mechanism,
      a back side surface located opposite the front side surface,
      a left side surface,
      a left edge between the left side surface and the front side surface,
      a top side surface,
      a top edge between the top side surface and the front side surface wherein the top edge is longer than the left edge,
      a bottom side surface, and
      a keying feature extending from the front side surface to the back side surface, wherein:
         the keying feature prevents improper insertion of the front side surface of the removable data cartridge through an aperture in a drive, and
         a cross-section of the outer casing at the front-most front side surface is not symmetric about any line extending from the left side surface to the right side surface, further wherein the cross-section of the front side surface is parallel to the front side surface;
   an electrical connector accessible from outside the outer casing at the first opening in the front side surface; and
   a memory device restrained on all sides within the outer casing.

16. The removable data cartridge for storing information as recited in claim 15, wherein the cross-section oriented parallel to the front side surface has at least five edges.

17. The removable data cartridge for storing information as recited in claim 15, wherein the keying feature comprises a beveled surface.

18. The removable data cartridge for storing information as recited in claim 15, wherein the electrical connector provides an interface for use with a hard drive protocol.

19. The removable data cartridge for storing information as recited in claim 18, wherein the hard drive protocol is SAS, PATA, SATA, or SCSI.

20. The removable data cartridge for storing information as recited in claim 19, wherein the memory device comprises a hard drive.

21. The removable data cartridge for storing information as recited in claim 15, wherein the memory device comprises a solid state memory device.

22. The removable data cartridge for storing information as recited in claim 15, wherein the top side surface has a length that is at least 70 mm and a width that is at least 60 mm and the bottom side surface has a length that is at least 70 mm and a width that is at least 60 mm.

23. The removable data cartridge for storing information as recited in claim 15, wherein the top side surface has a length that is at least 100 mm and a width that is at least 70 mm and the bottom side surface has a length that is at least 100 mm and a width that is at least 70 mm.

24. A removable data cartridge for storing information, the removable data cartridge comprising:
an outer casing, including:
a front-most front side surface having first and second openings therein, the second opening above the first, and the second opening having at least one straight edge and forming a catch for a latching mechanism,
a back side surface located opposite the front side surface,
a left side surface,
a left edge between the left side surface and the front side surface,
a top side surface,
a top edge between the top side surface and the front side surface wherein the top edge is longer than the left edge,
a bottom side surface, and
a keying feature extending from the front side surface to the back side surface, wherein:
the keying feature prevents improper insertion of the front side surface of the removable data cartridge through an aperture in a drive, and
a cross-section of the outer casing at the front-most front side surface is not a mirror image about any line extending from the left side surface to the right side surface, further wherein the cross-section of the front side surface is oriented parallel to the front side surface;
an electrical connector accessible from outside the outer casing at the first opening in the front side surface; and
a memory device restrained on all sides within the outer casing.

25. The removable data cartridge for storing information as recited in claim 24, wherein the cross-section oriented parallel to the front side surface has at least five edges.

26. The removable data cartridge for storing information as recited in claim 24, wherein the keying feature comprises a beveled surface.

27. The removable data cartridge for storing information as recited in claim 24, wherein the electrical connector provides an interface for use with a hard drive protocol.

28. The removable data cartridge for storing information as recited in claim 27, wherein the hard drive protocol is SAS, PATA, SATA, or SCSI.

29. The removable data cartridge for storing information as recited in claim 28, wherein the memory device comprises a hard drive.

30. The removable data cartridge for storing information as recited in claim 24, wherein the memory device comprises a solid state memory device.

31. The removable data cartridge for storing information as recited in claim 24, wherein the top side surface has a length that is at least 70 mm and a width that is at least 60 mm and the bottom side surface has a length that is at least 70 mm and a width that is at least 60 mm.

32. The removable data cartridge for storing information as recited in claim 24, wherein the top side surface has a length that is at least 100 mm and a width that is at least 70 mm and the bottom side surface has a length that is at least 100 mm and a width that is at least 70 mm.

* * * * *